United States Patent [19]
Korvela et al.

[11] Patent Number: 5,603,911
[45] Date of Patent: Feb. 18, 1997

[54] PREPARING A CRYSTALLINE, STABLE SODIUM PERCARBONATE

[75] Inventors: Timo Korvela, Oulu; Jonni Ahlgren, Mustasaari, both of Finland; Bo Hedenäs, Helsingborg, Sweden; Ilkka Renwall, Espoo, Finland

[73] Assignee: Kemira OY, Espoo, Finland

[21] Appl. No.: 397,171

[22] PCT Filed: Sep. 7, 1993

[86] PCT No.: PCT/FI93/00356

§ 371 Date: Apr. 26, 1995

§ 102(e) Date: Apr. 26, 1995

[87] PCT Pub. No.: WO94/05594

PCT Pub. Date: Mar. 17, 1994

[30] Foreign Application Priority Data

Sep. 7, 1992 [FI] Finland ................................. 923995

[51] Int. Cl.$^6$ ................................................... C01B 31/24
[52] U.S. Cl. ........................... 423/266; 423/274; 423/415.2
[58] Field of Search ............................. 423/415.2, 274, 423/266

[56] References Cited

U.S. PATENT DOCUMENTS 3,883,640  5/1975  Smart ............................. 423/415.2
4,120,812  10/1978  Lutz.
4,329,244  5/1982  Brichard et al. ............................. 252/99

FOREIGN PATENT DOCUMENTS

WO92/17400  10/1992  WIPO.

*Primary Examiner*—Wayne Langel
*Attorney, Agent, or Firm*—Pennie & Edmonds

[57] ABSTRACT

The object of the invention is a process for preparing a crystalline, stable sodium percarbonate, in which polymers of gross formulas (I or II) are added in the preparation process to control the crystal form of the sodium percarbonate and to coat the crystals, the molecular weight of the polymers varying in the range from 500 to 1,000,000 g/mol, or salts of these polymers or mixtures of polymers of formulas (I and It) or of their salts are added. Formula (I) denotes (I) and formula (II) denotes (II): HO—(—$CH_2$—$CH_2$—O)$_r$—(CH$CH_3$—$CH_2$—O)$_s$—(—$CH_2$—$CH_2$—O)$_t$—H and X<100% and Y>0%, R$_1$ is —H or —$CH_3$, R$_2$ is —COOM, in which M may be H$^+$ or a cation, in particular Na$^+$, K$^+$ or NH$^+_4$, R$_7$ and R$_8$ may be identical or different, being —COOM, —CONR$_5$R$_6$, H, —OH or —COO(—$CH_2$—$CH_2$—O)$_r$—(CH$CH_3$—$CH_2$—O)$_s$—(—$CH_2$—$CH_2$—O)$_t$—H and R$_5$ and R$_6$ are —H or an alkyl group, in particular C$_1$—C$_4$ and may be mutually identical or different groups and r, t and s may vary respectively in the range from 0 to 100%, their sum being 100%.

14 Claims, 3 Drawing Sheets

PREPARING A CRYSTALLINE, STABLE SODIUM PERCARBONATE

The invention relates to a process for preparing a crystalline, stable sodium percarbonate by crystallizing an aqueous solution of starting materials.

Sodium percarbonate is a water-soluble, crystalline peroxygen compound with the molecular formula $_2Na_2CO_3 \cdot 3H_2O_2$. It has a theoretical active oxygen concentration (AO) of 15.28% by weight. Sodium percarbonate is relatively well water-soluble, sodium carbonate and hydrogen peroxide being released in the solution. Owing to this characteristic sodium percarbonate has, in fact, a widespread application as a bleaching agent. It is particularly suitable for bleaching textiles and for removing coloured stains from textiles in industry and households.

Compared to another common bleaching agent, sodium perborate, sodium percarbonate is considerably faster dissolved in cold water and does not require any special bleaching activator, and is thus also energy-saving. Moreover, compared to perborates and chlorous bleaching agents, sodium percarbonate does not generate any polluting residues.

The stocking of sodium percarbonate involves certain problems. In a cooled, dry storage it is conserved as such for long periods of time. If, however during storage, the relative humidity of air is greater than the critical relative humidity of the product sodium percarbonate will absorb water from the surrounding air. This process is enhanced by a temperature raise and causes a reduction of the AO concentration as a function of time. Sodium percarbonate will be dissolved in the absorbed water into a saturated solution consisting of sodium carbonate and hydrogen peroxide. Sodium carbonate increases the basicity of the solution, which, again, accelerates the natural decomposition of hydrogen peroxide in the solution. Moreover, due to the preparation process and the raw materials, impurities may occur in the product, which accelerate the decomposition of hydrogen peroxide. Such impurities with a catalytic activity are transition metal ions, among others.

In fact, when preparing sodium percarbonate with crystallization methods, it is commonly known to carry out a preliminary purification of sodium carbonate by adding water-soluble Mg salt to its solution, the Mg salt precipitating magnesium carbonate from the solution and metal salt impurities being coprecipitated. In addition to this, the product may be stabilized by adding agents complexing the metal salts concerned and by precipitating finely-divided magnesium silicate in the product, which will protect the hydrogen peroxide in the product against heterogenic decomposition by catalysis of the surfaces of solid impurities.

Because of the catalytic decomposition mechanism, the water absorption tendency of the product can be reduced in the preparation step, since thus the amount of solution phase formed by absorbed water and sodium percarbonate in the finished product, in which dissolved hydrogen peroxide is apt to be decomposed, will be small.

Certain requirements are posed on the physical properties of the product crystals depending on the way the product is used. Thus, the crystals should not generate dust, and also, their size and the bulk density of the product formed by them should be appropriate to be admixed with other detergent components and also adequate for normal packing techniques. These additional requirements have resulted in the practical need to use additives controlling crystal growth in the preparation step, called "crystal modifiers", in order to obtain the desired physical properties of the crystals.

Several methods using crystal modifiers for preparing sodium percarbonate to be used as a bleaching agent are previously known. One way of increasing the stability of sodium percarbonate is to use aminopolycarboxyl acid and/or α-hydroxyacrylic acid as modifiers in the crystallization, as described in the patent specifications JP 63 147 804, JP 63 215 502 and JP 1153 510 (Nippon Peroxide).

DE 2 364 634 (Degussa) discloses a process for preparing sodium percarbonate, in which polycarboxylates are added to the reaction mixture of alkali carbonate and hydrogen peroxide. Besides acrylic acid or its derivative, polycarboxylates contain vinyl alcohol derivatives and acrolein.

According to DE published patent application 23 03 627 (ICI) a water-soluble polyelectrolyte is used as a means for salting out sodium percarbonate crystals. Acrylic polymers are mentioned as appropriate polyelectrolytes.

GB patent specification 1469 352 (Peroxid-Chemie) describes a process for preparing sodium percarbonate by adding hexametaphosphate or polyacrylate as a modifier to the sodium carbonate solution.

Though there have been attempts to enhance the chemical properties and the suitability as a detergent component of sodium percarbonate with several processes, commercially available sodium percarbonate products are still extremely instable and their crystal size is not suitable to be used in detergent powders.

The purpose of this invention is to provide a process that enables to yield sodium percarbonates having a good mechanical strength, an adequate particle size and a good ability to conserve active oxygen.

The object mentioned above is achieved by using organic polymers according to the invention to control the crystal form of sodium percarbonate and to coat the crystals.

Sodium percarbonate crystals that were surprisingly stable and only slightly hygroscopic were obtained by using the polymers of claim 1 as crystal modifiers. The crystals were confirmed to have a regular rounded shape and the crystal size (0.1 to 1 mm) was particularly suitable to be used along with other detergent components. Only a reduced amount of material having too fine a crystal size or an inadequate shape was produced. The average bulk density of the product was in the range from 0.5 to 0.6 g/cm$^3$ and the active oxygen concentration was approx. 14%.

The sodium percarbonate crystals preserved their active oxygen concentration for quite a long time. Only 0.9 to 1.5% of the active oxygen had disappeared during a stocking of six weeks, at a temperature of 30° C. and in a relative humidity of 70%. Tests in similar conditions for hygroscopicity yielded equally good results.

The process according to the invention uses organic polymers for controlling the crystal form of sodium percarbonate and for coating the crystals, the polymers having a molecular weight in the range of 500 to 1,000,000 g/mol and the following molecular formula

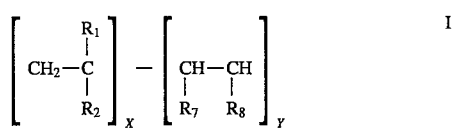

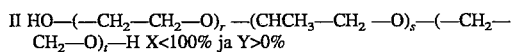

$R_1$ is —H or —CH$_3$ $R_2$ is —COOM, in which M may be H$^+$ or a cation, especially Na$^+$, K$^+$ or NH$^+_4$ $R_7$ and $R_8$ may be identical or different, being —COOM, —CONR$_5$R$_6$, H, —OH or —COO (—CH$_2$—CH$_2$—O)$_r$—(CHCH$_3$—CH$_2$—O)$_s$—(—CH$_2$—CH$_2$—O)$_t$—H and in which $R_5$ and $R_6$ are —H or alkyl groups, especially $C_1$-$C_4$ and may be identical or different groups and r, t and s may vary respectively in the range from 0 to 100%, their sum being 100%. Copolymers defined in formulas (I) and (II) may be random, alternating or block copolymers.

The polymers of formula I and II are known per se.

Appropriate polymers are methacrylic, acrylic and maleic or fumaric acid copolymers and/or their salts or (meth-)acrylic acid and acrylamide copolymers and/or their salts or ethylene oxide and propylene oxide copolymers or mixtures of these polymers. Copolymers of acrylic acid and maleic acid, their salts, copolymers of acrylic acid and acrylamide, their salts, copolymers of ethylene oxide and propylene oxide, and mixtures of all the above polymers are cited as particularly appropriate polymers.

In terms of the invention, sodium percarbonate was prepared by adding simultaneously a soda solution and an aqueous solution of hydrogen peroxide into a simulated mother liquor. Metal impurities were removed from the soda solution by means of magnesium sulfate before the use. Sodium silicate had been added to the aqueous solution of hydrogen peroxide in order to stabilize the solution. The mother liquor contained a soda solution, a polymer for modifying and coating the crystals, as well as sodium chloride for salting out. Sodium percarbonate crystals were added to the mother liquor as seed crystals at the stage when the mother liquor became slightly turbid. The reaction temperature was 20° C. and the mixing rate 142 rpm. The sodium percarbonate crystals formed were washed with an aqueous solution of soda and hydrogen peroxide and were dried over night.

The appropriate polymer concentration varies in the range from 10 to 1000 ppm, being preferably about 100 ppm. The polymer concentration denotes the concentration of formula I or II or mixtures of them or the concentration of the salts of such polymers or polymer mixtures.

Figure 1:
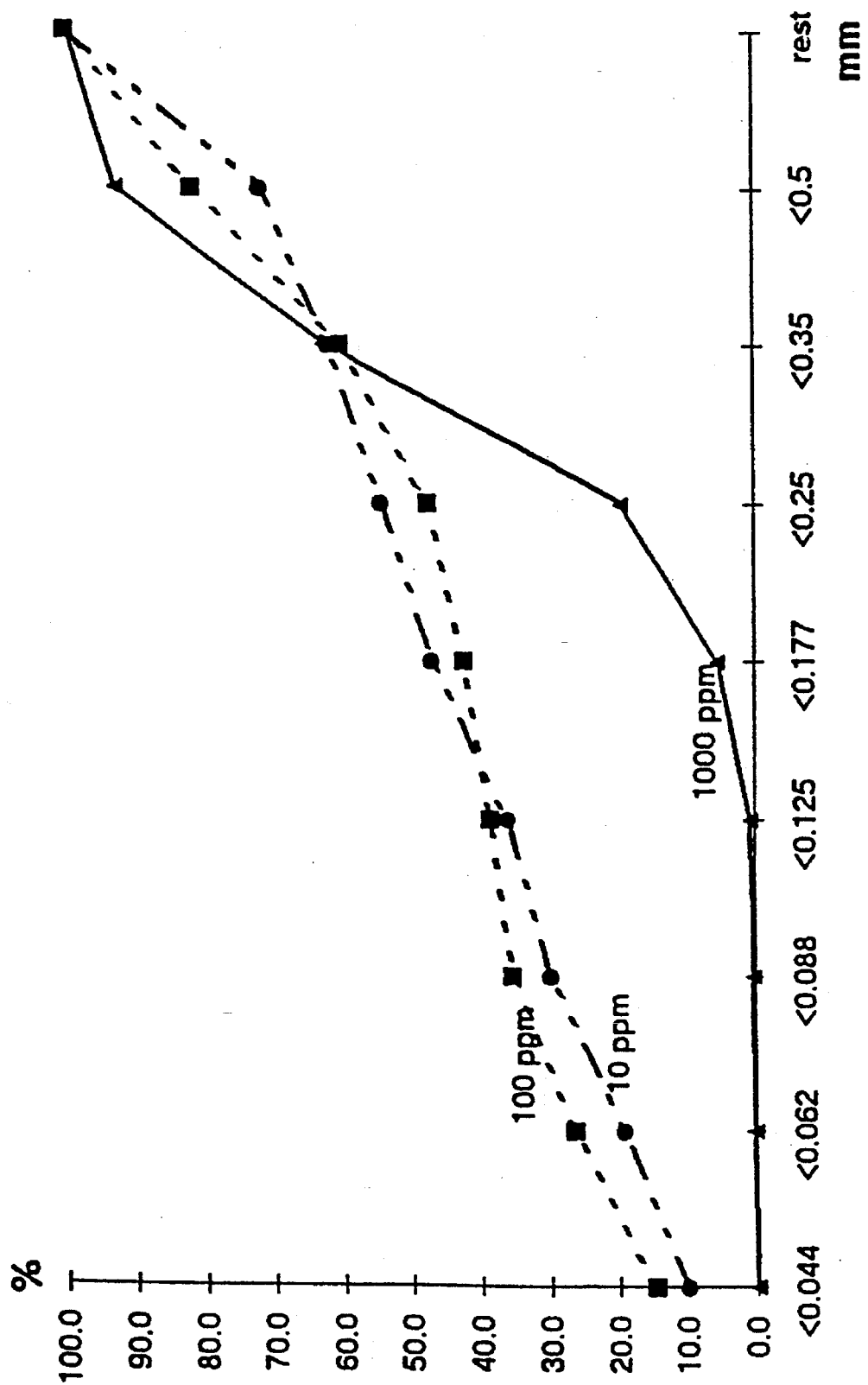
FIG. 1 is a graph showing that as polymer concentration increases, crystal size also increases.
Figure 2A:
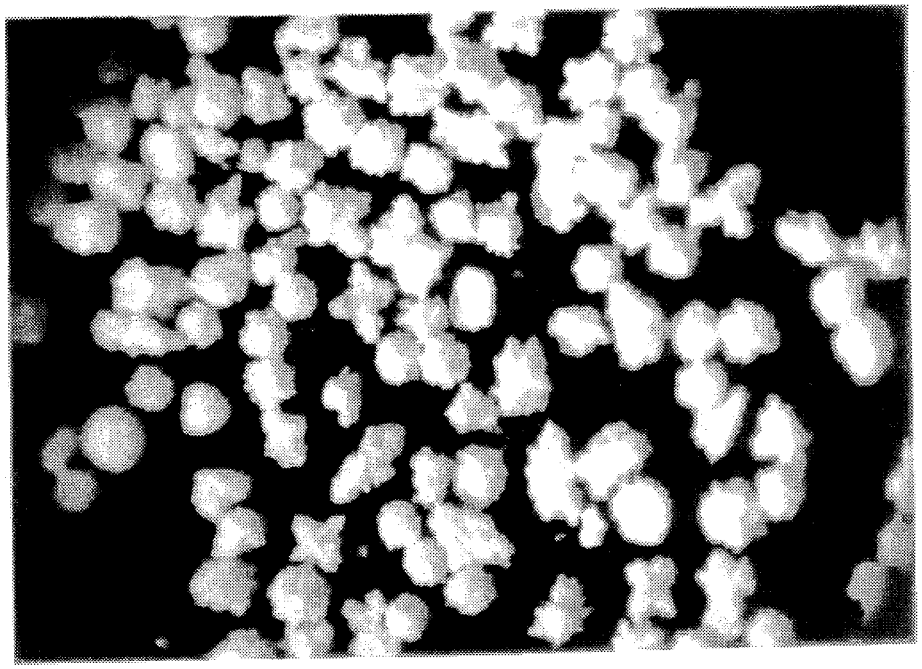
FIGS. 2A, 2B, 2C and 2D are photomicrographs which show that, as the polymer concentration increases, the "coarseness" of the crystals disappears.
Figure 2B:
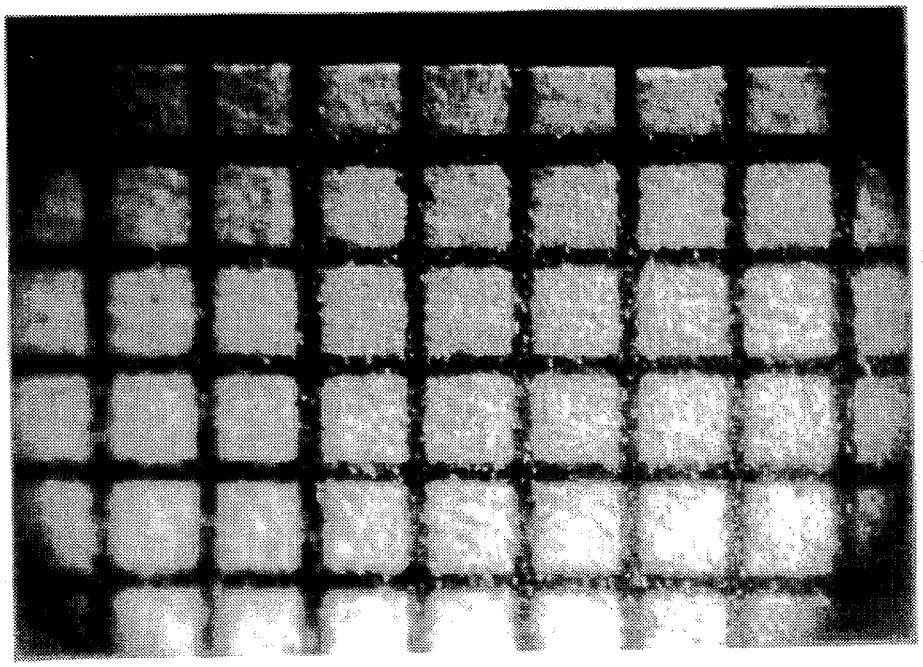
Figure 2C:
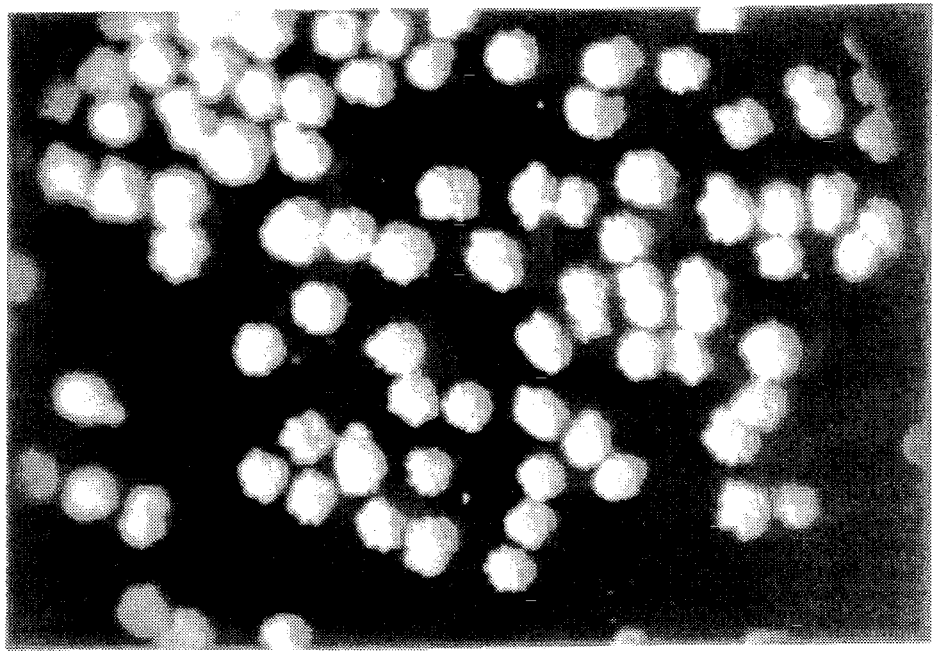
Figure 2D:
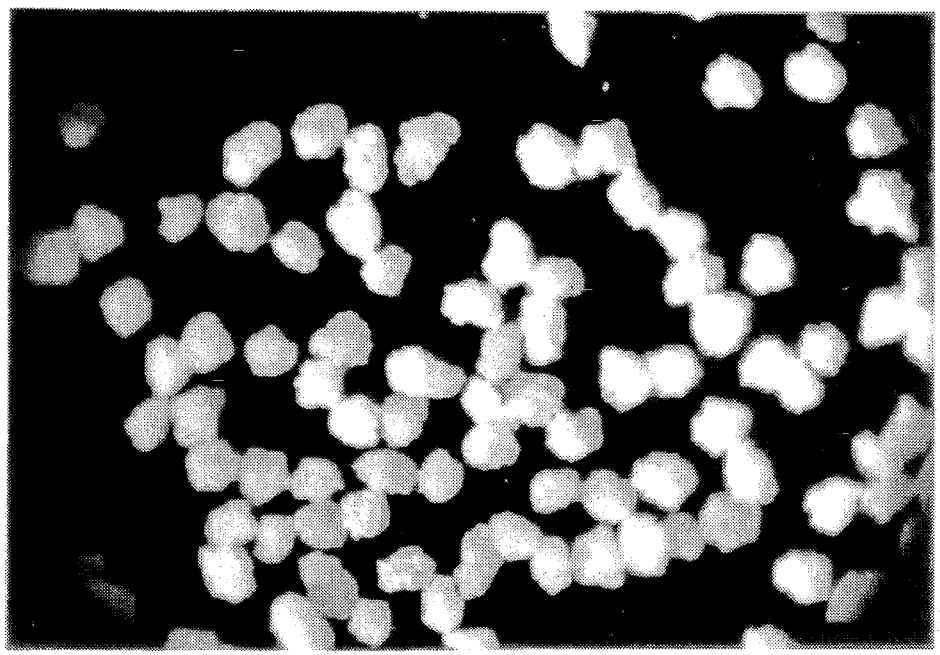

The polymers appropriate for modifying and coating the crystals allow wide variations of the preparation process. As the polymer concentration increases the crystallization rate decreases, whereas the bulk density and the crystal size grow. Also, as the polymer concentration increases, the "coarseness" of the crystals disappears. (FIGS. 1, 2A, 2B, 2C and 2D). The polymer concentration did not apparently affect the decomposition rate of sodium percarbonate. On the other hand, sodium chloride used for salting out does affect the decomposition rate. When sodium chloride was not used at all, the decomposition rate of the sodium percarbonate crystals was approx. 2.5 times as rapid. When the hydrogen peroxide solution was first added to the mother liquor, needle-shaped crystals inadequate for the purpose were obtained.

Appropriate polymers have a molecular weight in the range from 1000 to 200,000 g/mol, in particular from 2000 to 130,000 g/mol.

A number of embodiment examples are presented below with the only purpose to illustrate the present invention.

EXAMPLE 1

Sodium percarbonate was prepared as follows: 127 g of 50% aqueous solution of hydrogen peroxide and 375 g of 30% aqueous solution of $Na_2CO_3$ were simultaneously added to a mother liquor containing 7.5 g of $Na_2CO_3$, 55 g of NaCl, 200 g of water and 10 to 1000 ppm of organic polymer (tables 1 and 2), for one hour at room temperature and by stirring at a rate of 142 rpm. The aqueous solution of hydrogen peroxide had been stabilized with an aqueous solution of sodium silicate (1.84 g of sodium silicate had been dissolved in 5 g of water).

The aqueous solution of sodium carbonate had been purified with magnesium sulfate.

After the hydrogen peroxide solution and the soda solution had been added, the mother liquor was stirred for half an hour more. Sodium percarbonate seed crystals were added to the mother liquor as the solution started to become opaque.

The crystals were filtered, washed with an aqueous solution of sodium percarbonate, which had been obtained by dissolving 22.5 g of $Na_2CO_3 \times 1.5$ $H_2O_2$ in 150 g of water. The crystals were dried at a temperature of 30° C. over night.

TABLE 1

Organic polymers used for controlling the crystal shape of sodium percarbonate

| Polymer | | Maleic acid$^x$ % | Acrylic acid$^x$ % | Molecular weight g/mol |
|---|---|---|---|---|
| Fennodispo B41 | 1) | 80 | 20 | 3000–4000 |
| MA 50/70 | 2) | 50 | 50 | 70000 |
| MA 50/20 | 2) | 50 | 50 | 20000 |
| MA 30/130 | 2) | 30 | 70 | 130000 |
| MA 30/40 | 2) | 30 | 70 | 40000 |
| Sokalan CP12S | 3) | 30 | 70 | 3000 |
| Fennodispo A47 | 4) | | | 4000 |

1) a maleic acid and acrylic acid copolymer, in which an ethylene oxide and propylene oxide copolymer has been grafted on to one of the carboxylic groups of maleic acid (Kemira)
2) sodium salt of maleic acid and acrylic acid copolymer (Kemira)
3) sodium salt of maleic acid and acrylic acid copolymer (Sokalan Basf)
4) sodium salt of acrylic acid and acrylamide copolymer (Kemira)
$^x$maleic acid and acrylic acid concentrations without side chains. (Except for Fennodispo B41, for which the Figures of the table indicate the ratio between maleic acid and acrylic acid).

TABLE 2

The effect of the polymer concentration used for controlling the crystal form

| Polymer | ppm[1] | Active oxygen concen. % | Bulk density g/cm³ | Yield[2] % | <0.35 mm % | <0.25 mm % |
|---|---|---|---|---|---|---|
| MA 50/20 | 10 | 13.6 | 0.48 | 71.8 | 62.1 | 54.1 |
| MA 50/20 | 100 | 13.5 | 0.51 | 70.0 | 60.2 | 47.5 |
| MA 50/20 | 1000 | 14.4 | 0.90 | 32.0 | 62.7 | 19.3 |

[1] dry-matter content of the polymer calculated on the total amount of reactants used for the crystallization
[2] the yield percentage has been calculated after a settling of two hours The results in table 2 lead to the conclusion that as the polymer concentration grows from 10 to 1000 ppm the crystallization rate decreases (the yield is reduced), whereas the bulk density and the crystal size grow.

EXAMPLE 2

Table 3 illustrates the active oxygen concentration (AO), bulk density, crystal size distribution, decomposition and hygroscopicity of stable sodium percarbonate.

TABLE 3

100 ppm of polymer was used for controlling the crystal form.

| Polymer | AO[1] % | Bulk density g/cm³ | Yield[2] % | Crystal size <0.35% | Decomposition % (rel.) t = 611 h[3] | Pick up of moisture % t = 611 h[3] |
|---|---|---|---|---|---|---|
| Fermodispo B41 | 14.1 | 0.59 | 58.0 | 92.8 | 4.3 | 2.4 |
| MA 50/70 | 13.6 | 0.56 | 63.3 | 61.3 | 3.8 | 1.0 |
| MA 50/20 | 13.5 | 0.51 | 70.0 | 60.2 | 8.0 | 0.2 |
| MA 30/130 | 13.9 | 0.53 | 66.0 | 65.2 | 5.2 | 2.8 |
| MA 30/40 | 14.4 | 0.58 | 66.6 | 49.4 | 5.6 | 2.6 |
| Sok. CP12S | 14.4 | 0.76 | 69.3 | 31.6 | 3.6* | 2.1* |

*t = 641 h
[1] active oxygen concentration
[2] calculated yield % = 100 × (Na₂CO₃ × 1.5 H₂O₂) molecular quantity/Na₂CO₃ molecular quantity
[3] at a temperature of 30° C. and a 70% relative humidity, in open dishes throughout all stability tests When polymers of the MA range are being used, 50 to 65% of the sodium percarbonate crystals obtained are under 0.35 mm. When Sokalan CP12S polymer are used, "coarser" crystals are obtained (32% are under 0.35 mm). Fennodispo B41 polymer yields more finely-divided crystals than the polymers of the MA range (93% are under 0.35 mm). The bulk density varies from 0.51 to 0.58 g/cm³ for the polymers of the MA range, for Sokalan CP12S 0.76 g/cm³ was yielded and for Fennodispo B41 the outcome was 0.59 g/cm³.

TABLE 4

Stability tests
Active oxygen concentration and decomposition
Temperature 30° C., relative humidity 70%, 100 ppm of polymer

| | Polymer Active oxygen (%) | | | | | Decomposition (%) per week | | | |
|---|---|---|---|---|---|---|---|---|---|
| Time h | 0 h | 164 | 448 | 611 | 990 | 164 h | 448 | 611 | 990 |
| Fermodispo B41 | 13.8 | 16.6 | 13.5 | 13.2 | 12.8 | 1.48 | 0.82 | 1.20 | 1.23 |
| MA 50/70 | 13.0 | 13.0 | 12.7 | 12.5 | 12.0 | 0.00 | 0.87 | 1.06 | 1.31 |
| MA 50/20 | 13.8 | 13.3 | 12.8 | 12.7 | 12.3 | 3.71 | 2.72 | 2.19 | 1.87 |
| MA 30/130 | 13.5 | 13.0 | 12.8 | 12.8 | 12.5 | 3.79 | 1.94 | 1.43 | 1.26 |
| MA 30/40 | 14.2 | 13.8 | 13.6 | 13.4 | 13.1 | 2.89 | 1.58 | 1.55 | 1.31 |
| Sokl. CP12S | 14.0 | 13.7 | 13.7* | 13.5* | | 2.20 | 1.10** | 0.94** | |

*t = 326 h and t = 641 h
**t = 326 h and t = 641 h

TABLE 5

Hygroscopicity tests
Temperature 30° C., relative humidity 70%, 100 ppm of polymer

| Polymer | Pick up of moisture, $H_2O$ % | | | | |
|---|---|---|---|---|---|
| Time h | 0 h | 164 | 448 | 611 | 990 |
| Fennodispo B41 | 0 | 1.8 | 2.0 | 2.4 | 3.6 |
| MA 50/70 | 0 | 0.6 | 0.9 | 1.0 | 2.3 |
| MA 50/20 | 0 | 0.6 | 0.2 | 0.2 | 1.2 |
| MA 30/130 | 0 | 2.7 | 2.7 | 2.8 | 3.9 |
| MA 30/40 | 0 | 1.4 | 2.0 | 2.6 | 3.8 |
| Sokl. CP12S | 0 | 1.2 | 2.0* | 2.1* | |

*t = 326 h and t = 641 h

The AO concentration decreased by 0.3 to 0.6% during the first week when using the polymers of the MA range (30° C., relative humidity 70%). At the end of six weeks the AO concentration was 0.9 to 1.5% lower. When using Fennodispo MA 50/70 polymer there was no decrease at all in the first week.

The average decomposition per week was 1 to 2% in a test series of six weeks. The decomposition rate was clearly higher in the first week than in the subsequent weeks.

EXAMPLE 3

The decomposition and moisture content of sodium percarbonate crystals prepared according to the invention were compared to a commercially available sodium percarbonate product prepared by Interox. The tests were performed at a temperature of 40° C. and a 75% relative humidity.

TABLE 6

Decomposition and hygroscopicity tests
Temperature 40° C., relative humidity 75%

| Polymer | Decomposition (%) per week | Pick up of moisture (%) per week |
|---|---|---|
| Interox* | 46 | 39 |
| Fenno-dispo A47 | 8 | 8 |
| Fenno-dispo B41 | 7 | 2 |
| MA50/70 | 4 | 2 |

*compared to a commercially available sodium percarbonate product

With regard to the outcome it can be noted that the products according to the invention were decomposed considerably slower and their pick up of moisture content was markedly lower than that of the commercially available product.

EXAMPLE 4

In continuous, experimental preparation of sodium percarbonate 20 kg/h of 50% $H_2O_2$, which also contained 0.45% $MgCl_2$, was fed into a vacuum crystallizer of MSMPR type with a 200 l liquid volume, and additionally 100 kg/h of soda solution, which had been precleansed with $MgCl_2$. The concentration of the soda solution was 20% $Na_2CO_3$, 10% NaCl and 0.12% $Na_2SiO_3$. Moreover, Fennodispo B41 was added into the crystallizer as a crystal modifier in an amount such as to form a concentration in the crystallizer representing a) 10 ppm and b) 100 ppm. A 30° C. temperature and a 45 mbar absolute pressure were maintained in the crystallizer, the average residence time being 2 h. The crystal slurry containing 17.5% of SPC(sodium percarbonate) crystals was removed from the crystallizer continuously about 100 l/h, the crystals were separated from the mother liquor with a vacuum band filter and washed with a water solution saturated with regard to SPC. The water content of the washed humid crystal cake was 19% in test a) and respectively 18% in test b).

The analysis results of the samples dried in a fluidized-bed drier are presented in table 7.

TABLE 7

Fluidized-bed dried SPC samples of a continuous Pilot scale crystallizer with Fennodispo B41 as a crystal modifier a) 10 pp, b) 100 ppm

| Process step | a | b |
|---|---|---|
| AO, % | 15.2 | 15.2 |
| SPC (calculated on AO) % | 99.4 | 99.2 |
| Cl, % | 0.1 | 0.1 |
| $H_2O$, % | 0.1 | 0.2 |
| Bulk density, g/cm³ | 0.85 | 0.85 |
| Decomposition per week, %*) | 2.1 | 0.52 |
| Moisture absorption per week, %*) | 0.01 | 0.00 |

*)Calculated on the outcome of a stability test of one week.
Testing conditions: 30° C. and 70% (RH = relative humidity).

The test indicates that a good product quality is maintained or even improved, particularly with regard to hygroscopicity, when the process of the invention is implemented in continuous production.

We claim:

1. A process for preparing a crystal form of sodium percarbonate, said process comprising the steps of:

contacting hydrogen peroxide and sodium carbonate in an aqueous solution to form dissolved sodium percarbonate;

adding to said solution during said contacting step at least one polymer for controlling said crystal form of said sodium percarbonate and for providing a protective coating for said sodium percarbonate, said polymer having one of the following formulae:

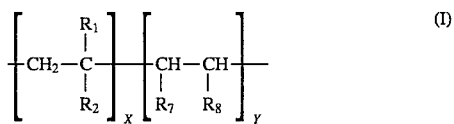

(I)

(II)

or a salt of said formula (I), a salt of said formula (II) or a mixture thereof wherein X <100% and Y>0%, wherein $R_1$ is —H or —$CH_3$, wherein R2 is —COOM, wherein M is $H^+$ or a cation selected from the group consisting of $Na^+$, $K^+$ and $NH_4^+$, wherein $R_7$ and $R_8$ are the same or different and $R_7$ and $R_8$ are each selected from the group consisting of -COOM, -COOL and mixtures thereof, wherein M is $H^+$ or a cation selected from the group consisting of $Na^+$, $K^+$ and $NH_4^+$, wherein L is —(—$CH_2$—$CH_2$—O)$_r$—(CHCH$_3$—CH$_2$—O)$_s$—(—$CH_2CH_2$—O)$_t$H, wherein each of r, s and t are in a range from 0 to 100% and have a sum of said r, said s and said t of 100% and wherein said polymer has a molecular weight of between 500 to 1,000,000 grams; and precipitating and recovering said sodium percarbonate from said solution in said crystal form.

2. The process of claim 1 wherein the polymer used for controlling said crystal form and for coating said sodium percarbonate is a first copolymer of methacrylic acid and maleic acid, a second copolymer of acrylic acid and maleic acid, a first salt of said first copolymer, a second salt of said second copolymer or a mixture thereof, wherein said first and second salts are formed with a $Na^+$, $K^+$ or $NH_4^+$ cation.

3. The process of claim 1 wherein said polymer is a copolymer of ethylene oxide and propylene oxide.

4. The process of claim 1 wherein said polymer is used in a concentration of from about 10 to 1000 parts per million.

5. The process of claim 4 wherein said polymer is used in a concentration of about 100 parts per million.

6. The process of claim 5 wherein said molecular weight is between 1,000–200,000 grams.

7. The process of claim 6 when said molecular weight is between 2,000–130,000 grams.

8. The process of claim 1 wherein said crystal form has a moisture content of between about 0.1 and 0.2 percent by weight.

9. A process for preparing a crystal form of sodium percarbonate, said process comprising the steps of:

contacting hydrogen peroxide and sodium carbonate in an aqueous solution to form dissolved sodium percarbonate;

adding to said solution during said contacting step at least one polymer for controlling said crystal form of said sodium percarbonate and for providing a protective coating for said sodium percarbonate, said polymer having the following formula:

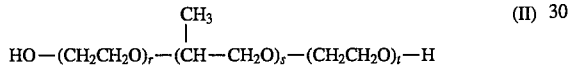
(II)

or a salt of said formula (II) or a mixture thereof
wherein X<100% and Y>0%, wherein $R_1$ is —H or —$CH_3$, wherein $R_2$ is —COOM, wherein M is $H^+$ or a cation selected from the group consisting of $Na^+$, $K^+$ and $NH_4^+$, wherein $R_7$ and $R_8$ are the same or different and $R_7$ and $R_8$ are each selected from the group consisting of -COOM, -COOL and mixtures thereof, wherein M is $H^+$ or a cation selected from the group consisting of $Na^+$, $K^+$ and $NH_4^+$, wherein L is —(—$CH_2$—$CH_2$—O)$_r$—(CHCH$_3$—CH$_2$—O)$_s$—(—$CH_2CH_2$—O)$_t$H, wherein each of r, s and t are in a range from 0 to 100% and have a sum of said r, said s and said t of 100% and wherein said polymer has a molecular weight of between 500 to 1,000,000 grams; and precipitating and recovering said sodium percarbonate from said solution in said crystal form.

10. The process of claim 9 wherein said polymer is used in a concentration from about 10 to 1000 parts per million.

11. The process of claim 10 wherein said polymer is used in a concentration of about 100 parts per million.

12. The process of claim 11 wherein said molecular weight of the polymer is between about 1,000 to 200,000 grams.

13. The process of claim 12 wherein said molecular weight of the polymer is between about 2,000 to 130,000 grams.

14. The process of claim 9 wherein said crystal form has a moisture content of between about 0.1 and 0.2 percent by weight.

* * * * *